R. HUTCHISON.
WATER TUBE BOILER.
APPLICATION FILED FEB. 8, 1909.
936,723.
Patented Oct. 12, 1909.
3 SHEETS—SHEET 1.
Fig. 1.
Fig. 2.
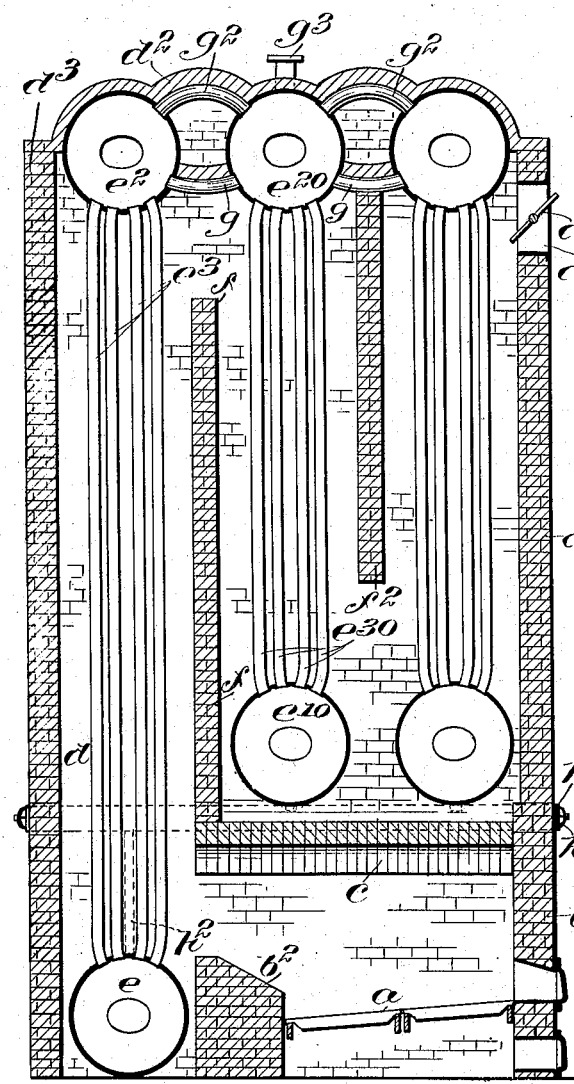
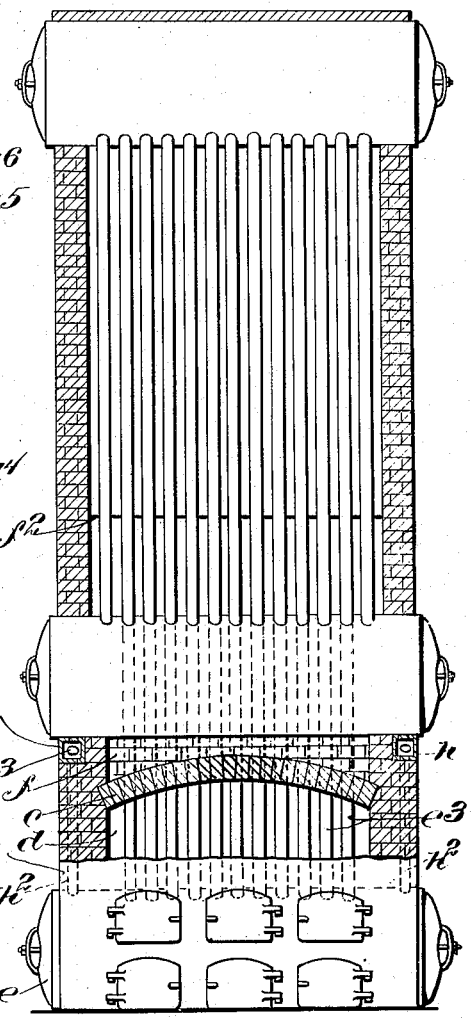
Witnesses:
Jas. J. Maloney
Inventor:
Richard Hutchison,
by H. J. Livermore
Att'y

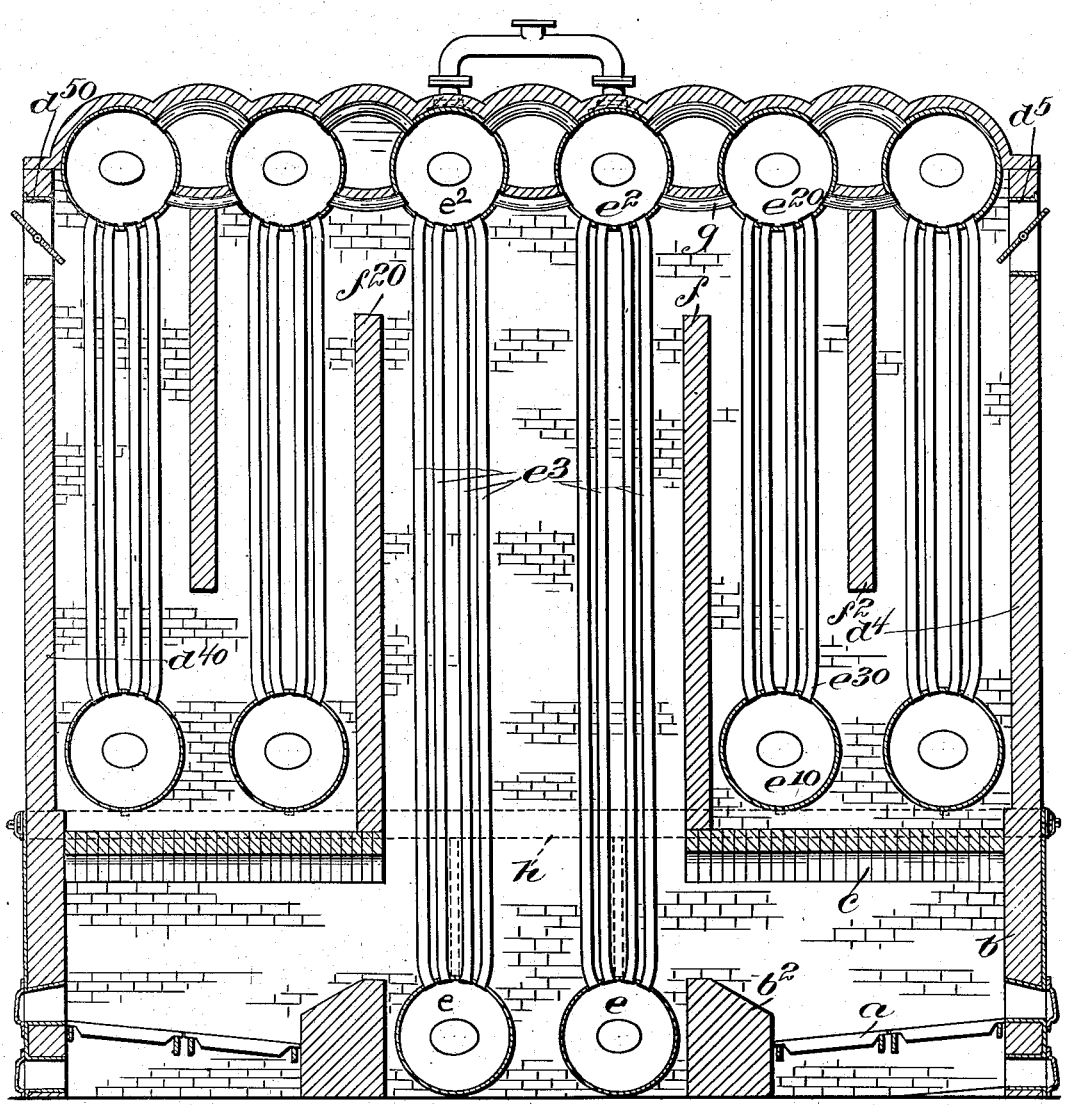

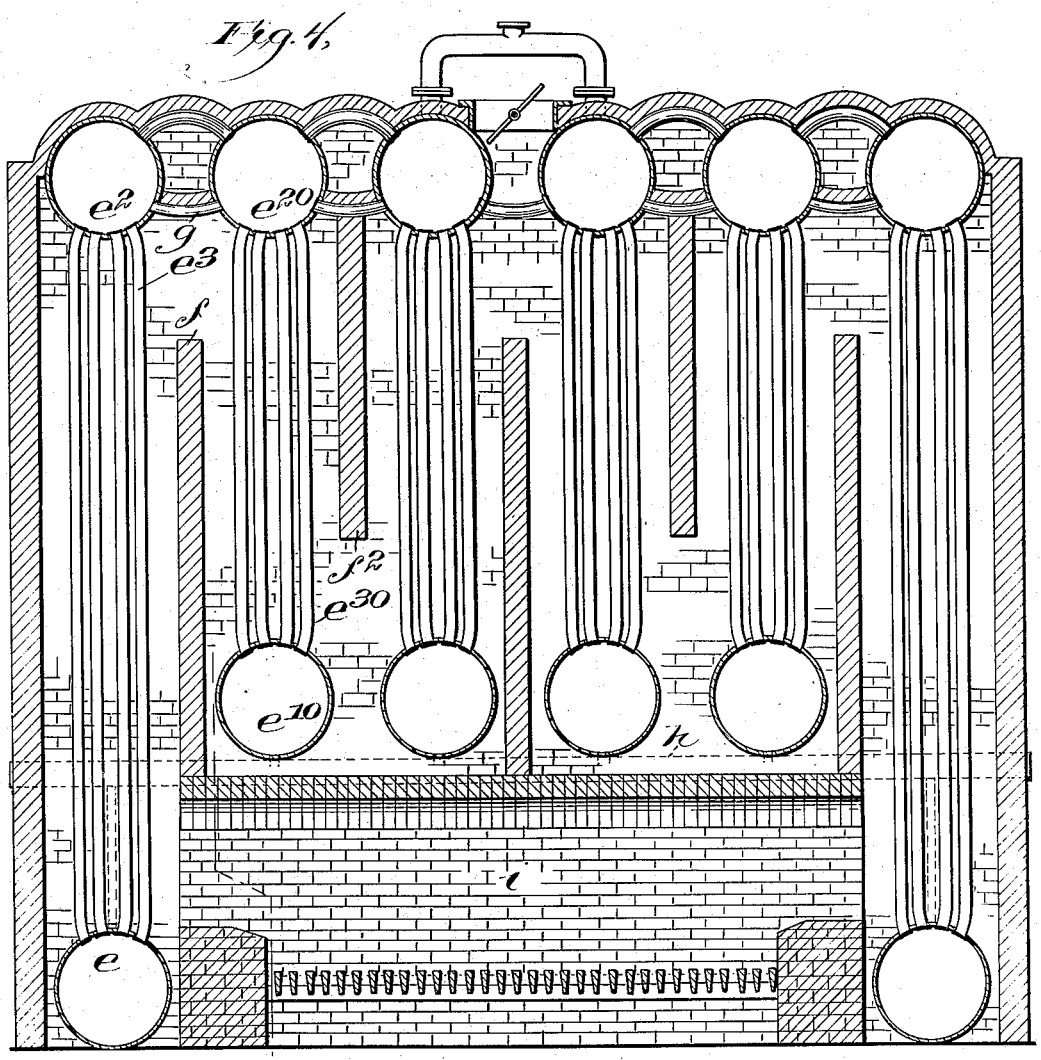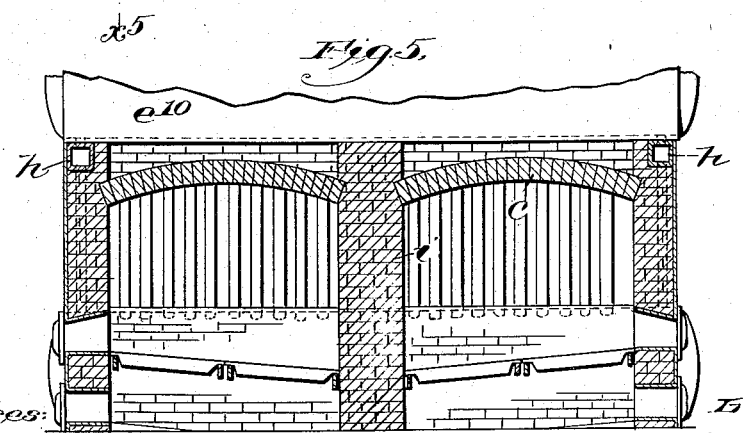

UNITED STATES PATENT OFFICE.

RICHARD HUTCHISON, OF BROOKLINE, MASSACHUSETTS.

WATER-TUBE BOILER.

936,723.  Specification of Letters Patent.  Patented Oct. 12, 1909.

Application filed February 8, 1909. Serial No. 476,790.

*To all whom it may concern:*

Be it known that I, RICHARD HUTCHISON, a citizen of the United States, residing in Brookline, in the county of Norfolk and State of Massachusetts, have invented an Improvement in Water-Tube Boilers, of which the following description, in connection with the accompanying drawings, is a specification, like letters on the drawings representing like parts.

The present invention relates to a steam boiler, and is mainly embodied in a novel arrangement of the water containing units with relation to the furnace, the purpose of the invention being to obtain a large heating surface and competent circulation of the gases with the greatest possible economy in floor space.

The boiler is of that type in which the several water-containing units consist of upper and lower drums connected together by water tubes which constitute the main heating surface, the said drums of the different units also being connected together by circulating tubes so as to produce water circulation throughout the entire system.

In order to economize space, the boiler is arranged with the principal unit outside of the bridge wall, the lower drum being below the bridge wall, and the upper drum at the top of the heat chamber. The remainder of the heating surface is provided for by means of two or more smaller units located over the top of the arch, the space above the arch being inclosed, and provided at or near the top with a flue for the escape of the products of combustion. The units are separated by means of baffle walls so as to deflect the gases and cause them to travel longitudinally along the water tubes which connect the drums of each unit.

A further feature of the invention consists in doubling the capacity of the steam generator by providing it with an additional furnace and an additional set of water-containing units, the said furnaces being at opposite sides or ends of the whole structure and a portion of the units being located in the space above the arches.

An important feature of this construction is that with two fires at opposite sides, the hot gases of one fire help to consume the cooler gases given off by the other fire when fresh coal is put on, so that by stoking the two furnaces alternately more perfect combustion and better economy are obtained.

Figure 1 is a vertical section of a boiler embodying the invention having a single furnace; Fig. 2 is an elevation, partly in section, on a plane at right angles to Fig. 1; Fig. 3 is a vertical section showing a boiler provided with two furnaces; Fig. 4 is a vertical section showing a modification of the double furnace construction; and Fig. 5 is a section on line $x^5$ of Fig. 4.

Referring to Fig. 1, the grate $a$ is located in the usual way between the front wall $b$ of the furnace, and the bridge wall $b^2$, the arch $c$ being located over the grate to deflect the products of combustion through the space between the rear of the said arch and the said bridge wall $b^2$ into the heat chamber $d$.

The water containing part of the boiler is formed in a plurality of units each of which consists of upper and lower drums connected by vertical tubes. The main water-containing unit is located at the back of the bridge wall $b^2$, and consists of a lower drum $e$ which is behind the said bridge wall, and an upper drum $e^2$ connected with said lower drum by means of the tubes $e^3$. Above the arch $c$ there is located a baffle wall $f$ which extends upward along the tubes $e^3$ terminating near the upper drum $e^2$, the said upper drum being below the upper wall $d^2$ of the heat chamber. In the single furnace construction shown in Figs. 1 and 2, the heat chamber is closed by means of a back wall $d^3$, and the products of combustion rise along the tubes $e^3$, being confined in the space between the wall $d^3$ and the baffle wall $f$ until they are deflected toward the front of the furnace, then coming into contact with a second unit consisting of drums $e^{10}$ and $e^{20}$ connected by tubes $e^{30}$. This unit and one or more similar units, are located over the arch $c$, and the heat chamber $d$ is inclosed in front by means of a wall $d^4$ which extends upward above the front wall of the furnace, and is provided with the flue $d^5$ shown as controlled by the damper $d^6$. Between the units which are located above the arch of the furnace there is a baffle wall $f^2$ which extends from the top wall $d^2$ of the heat chamber downward nearly to the lower drums, so that the gases pass down one unit and up the other until they reach the flue $d^5$.

The water circulation is maintained throughout the several units by means of the circulating pipes $g$, while the steam is communicated with one of the upper drums through pipes $g^2$, the said drum being provided with the steam outlet $g^3$. The lower drums of the units are connected together by means of ducts $h$ which extend along the side walls of the furnace at opposite ends of the lower drums of the short units, as shown in Fig. 2, these ducts being connected by vertical tubes $h^2$ with the drum $e$. The ducts $h$ are also provided at opposite ends with detachable covers $h^3$ which can be removed for the purpose of cleaning out the ducts.

In the construction shown in Fig. 3, the arrangement is substantially like that described, except that the capacity of the generator is doubled by duplicating the water-containing units and employing two furnaces at opposite sides. In this construction the heat chamber is inclosed between the walls $d^4$ and $d^{40}$, and the long units $e$, $e^2$, $e^3$ are arranged adjacent to each other in the space between the baffle walls $f$ and $f^{20}$. The space containing the two long units is, therefore, in direct communication with both furnaces and the products of combustion mingle in the said space, passing outward, (after being circulated past the other units) through flues $d^5$ and $d^{50}$. By this arrangement a boiler of very large capacity can be built so as to occupy a relatively small amount of floor space, and this particular construction has the advantage that by stoking the furnaces alternately the hot gases from the furnace which is at incandescent heat assist in the combustion of the cooler gases given off from the new coal in the furnace which has last been stoked. Substantially the same results, however, can be obtained by the slightly modified arrangement shown in Figs. 4 and 5 in which the grates are parallel with the drums instead of transverse thereto. In this construction, the arches $c$ are separated by a transverse wall $i$, and the bridge walls are at the sides of the grates instead of at the ends. The short units occupy the interior space above the arches, and are separated by baffle walls as in the other construction. The products of combustion mingle in the space above the arches occupied by the shorter units, and pass out through a common flue at the top, instead of through separate flues, as in the construction shown in Fig. 3.

Claims.

1. In a boiler, a combustion chamber provided with a grate, an arch and a bridge-wall; front and rear vertical walls, the front wall being adjacent to the front of the grate and joined to the arch to inclose the combustion chamber, and the rear wall being separated from the arch by a space to contain a water-heating unit; a water heating unit located in said space and consisting of upper and lower drums united by tubes, the lower drum being located below the bridge-wall, and the upper drum at the top of the boiler chamber; a baffle-wall extending upward from the rear of the arch to inclose partially in connection with the front vertical wall a space above the arch, one or more water-heating units inclosed in said space, each unit consisting of upper and lower drums connected by vertical tubes; and circulating pipes connecting the upper drums of the several units.

2. In a boiler, a heat chamber provided with oppositely disposed grates; a bridge-wall at the back of each grate, said bridge-walls being separated by an intervening space; a water containing unit consisting of upper and lower drums and vertical tubes located in said space, the lower drum being below the tops of the bridge-walls; an arch over each grate; an inclosing wall extending upward from the front of each grate and provided with stoking and ash removing openings; baffle walls extending upward from the backs of said arches; and water containing units consisting of upper and lower drums connected by vertical tubes located above each arch.

3. A water-tube boiler having oppositely disposed grates; a heat chamber provided with a flue at the top bridge walls and arches located in the lower part of said heat chamber; stoking doors for said grates at opposite sides of said heat chamber; water-containing units consisting of drums connected together by tubes said units being located between said bridge walls and the walls of the heat chamber; other similar water containing units located over the arches; and baffle walls between adjacent water-containing units.

4. A water tube boiler comprising a heat chamber; a furnace located at each side of said heat chamber, each furnace having a grate, an arch, and a bridge wall; two water-containing units each comprising upper and lower drums connected together by a plurality of tubes, said units being located adjacent to each other in the space between the two furnaces; a plurality of shorter heat units located over each furnace; and flues located at opposite sides of the heat chamber.

In testimony whereof, I have signed my name to this specification in the presence of two subscribing witnesses.

RICHARD HUTCHISON.

Witnesses:
W. E. COVENEY,
JAS. J. MALONEY.